Nov. 8, 1932.  F. H. KRUPP  1,886,889
MIXING AND DIVERTING VALVE
Filed July 17, 1930   2 Sheets-Sheet 1
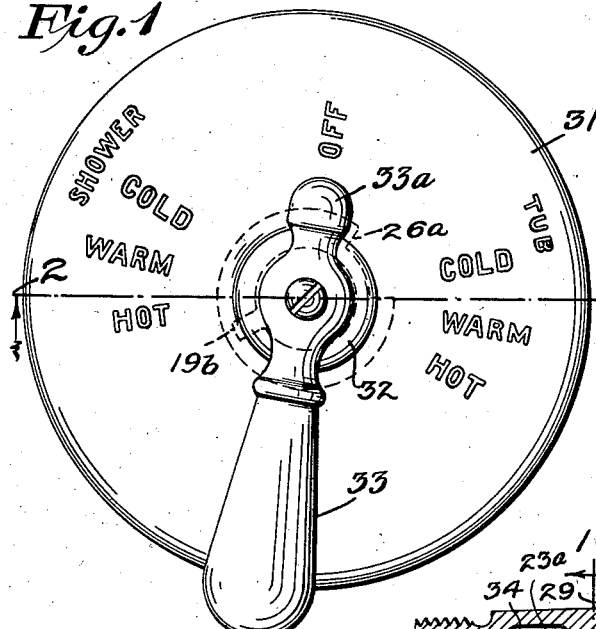
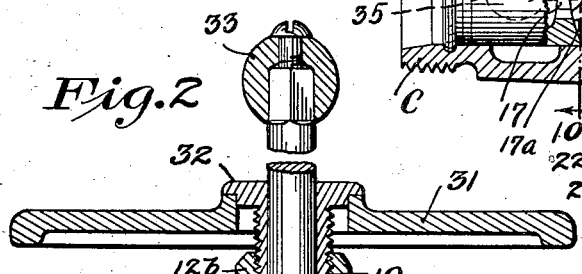
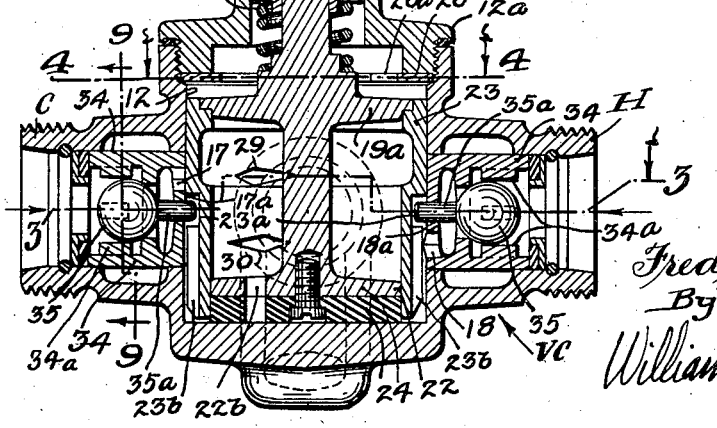
Inventor
Fred Hubert Krupp
By his Attorneys
Williamson & Williamson Nov. 8, 1932. F. H. KRUPP 1,886,889
MIXING AND DIVERTING VALVE
Filed July 17, 1930    2 Sheets-Sheet 2
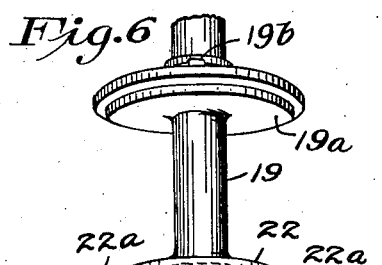
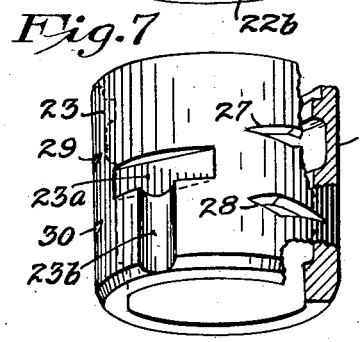
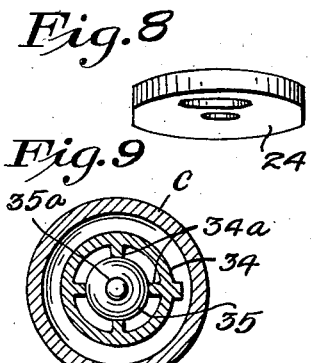
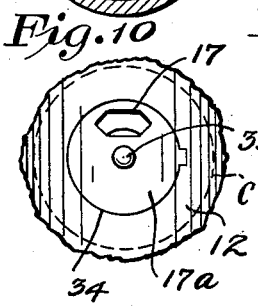
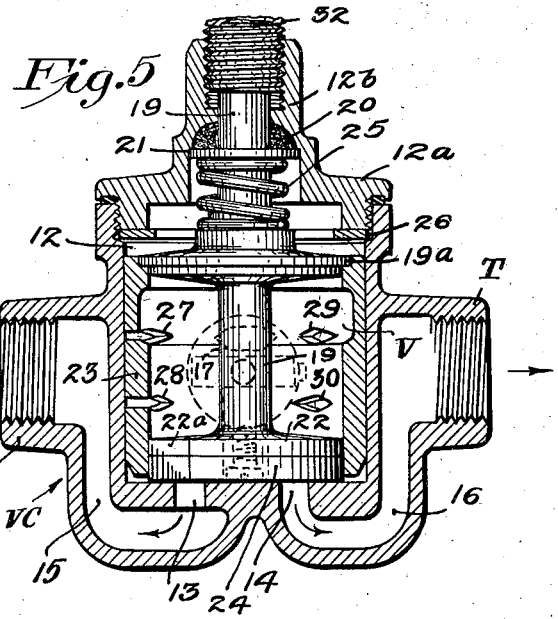
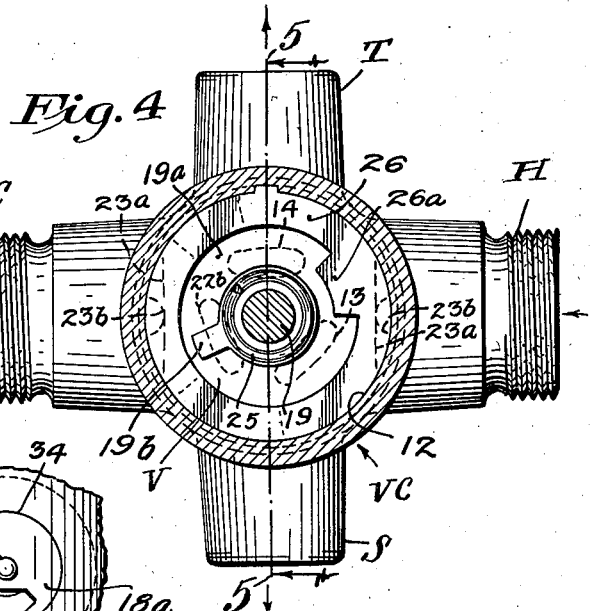
Inventor
Fred Hubert Krupp
By his Attorneys
Williamson & Williamson Patented Nov. 8, 1932

1,886,889

UNITED STATES PATENT OFFICE

FRED H. KRUPP, OF SOUTH GATE, CALIFORNIA, ASSIGNOR, BY DIRECT AND MESNE ASSIGNMENTS, OF THREE-FOURTHS TO GEORGE ALEXANDER MacDONALD, OF LOS ANGELES, CALIFORNIA, AND ONE-FOURTH TO LE ROY R. FINKE, OF HUNTINGTON PARK, CALIFORNIA

MIXING AND DIVERTING VALVE

Application filed July 17, 1930. Serial No. 468,504.

This invention relates to mixing and diverting valves and while capable of wide general application for mixing fluids from at least two sources of supply in various proportions and delivering the desired mixture from either of a pair of outlets, it is especially adapted for use in connection with hot and cold water supplies to deliver water through either of a pair of outlets and to control the temperature within certain limits of the water delivered.

It is the main object of my invention to provide a simple but highly efficient valve which will control the admixture of fluids taken from at least two different sources of supply and which will moreover deliver any desired mixture through either of a pair of outlets.

A further object is to provide a mixing and diverting valve especially adapted for use in connection with a source of cold water and a source of hot water, which will, by the manipulation of a single operating handle, mix the hot and cold water in proper proportions to cause water at any desired temperature (within, of course, certain limits) to be discharged through either of a pair of outlets and to moreover entirely shut off the flow of water.

More specifically it is an object of the invention to provide a mixing, diverting and shut off mechanism adapted for connection with two sources of fluid supply which employs a single combined valve member and mixing chamber and which is operative to mix the fluids drawn from said two sources of supply in any desired proportion and moreover divert and cause a desired mixture to be discharged through either of a pair of outlets.

Another object is to provide a valve of the class described wherein the valve member may be removed from its casing without turning off the supplies of hot and cold water, suitable check valves being provided to prevent the flow of water into the casing when the valve member is removed.

These and other objects and advantages of the invention will be apparent from the following description made in connection with the accompanying drawings wherein like reference characters refer to similar parts, throughout the several views and in which, Fig. 1 is a top plan view of an embodiment of my invention illustrating the operating handle and an indicating apparatus related therewith, the valve stem being mounted on a horizontal axis;

Fig. 2 is a longitudinal section taken on the line 2—2 of Fig. 1;

Fig. 3 is a cross section taken on the line 3—3 of Fig. 2, some parts being broken away;

Fig. 4 is a cross section taken on the line 4—4 of Fig. 2.

Fig. 5 is a longitudinal section taken on the line 5—5 of Fig. 4, illustrating the interior of my combined sleeve valve and mixing chamber and its connections with the shower and with the tub;

Fig. 6 is a perspective view of the flanged valve stem detached;

Fig. 7 is a perspective view of the rotary sleeve valve detached;

Fig. 8 is a perspective view of the gasket interposed between the valve seat and the mixing chamber;

Fig. 9 is a cross section taken on the line 9—9 of Fig. 2, showing the construction of the check valves to prevent flow of water into the valve casing when the valve member is removed; and Figs. 10 and 11 are cross sections taken on the lines 10—10 and 11—11 respectively of Fig. 3.

From the description which follows, it is to be understood that I do not in any way limit myself to valve structure for mixing and diverting hot and cold water, but merely for the purpose of illustration describe an embodiment of the invention adapted for controlling the supply and temperature of water to two different fixtures, such as a shower bath and a tub. It is, of course, obvious that my device may be applied wherever it is desired to mix two different fluids in various proportions and to also dispense desired mixtures through either of a pair of discharge passages.

In the embodiment of the invention illustrated, I provide a valve casing indicated as an entirety by the character VC and having centrally disposed therein a cylindrically recessed main chamber 12 substantially closed at its inner end and provided with an outer closure, such as the plug 12a having threaded engagement with the outer end thereof. The inner end of cylindrical member 12 is provided with a pair of outlet ports 13 and 14 respectively, as illustrated, said ports being of elliptical shape and disposed with their longitudinal edges at right angles to equal radii of the cylinder. A passage 15 connects port 13 with a cylindrical fitting or coupling member S, which, as illustrated, is adapted to be connected to the shower bath fixture, while a second passage 16 connects port 14 with another fitting or coupling member T oppositely disposed to fitting S and adapted to be connected with the supply of water to the bath tub. Passages 15 and 16 are disposed at the inner end of the valve casing VC and extend downwardly, outwardly and upwardly to communicate with said fittings, which are disposed radially of chamber 12. Casing VC also carries a pair of oppositely disposed fittings H and C, of similar shape and size to the fittings, adapted to be connected with two different sources of fluid or water supply. Thus, fitting H constitutes the hot water intake, while fitting C constitutes the cold water intake. A port 17 shaped as illustrated in Fig. 10, is formed through a disc 17a locked in cylinder wall of chamber 12 communicating eccentrically with fitting H, while a similarly shaped port 18 is formed in a disc 18a locked in the opposite portion of the chamber 12 eccentrically communicating with fitting C, said ports 17 and 18 being oppositely disposed relative to the common center line of fittings C and H and thus being disposed at different heights relative to the inner end of chamber 12.

A combined sleeve valve and mixing chamber indicated as an entirety by the letter V is rotatably mounted in chamber 12. As shown, this valve comprises a flanged stem 19 extending axially through chamber 12 and being journaled at its upper portion in a boss 12b of plug 12a, suitable packing material 20 being disposed within the boss of said plug, said boss forming a packing gland in connection with a washer 21 spring pressed upwardly.

Stem 19 has integrally formed therewith or otherwise rigidly secured an upper flange 19a and a lower flanged end 22, said end 22 being of disc shape but having straight side portions 22a. A sleeve valve member 23 snugly fits the flanges 21a and 22 of stem 19, flange 19a overlapping a shoulder on the inner periphery of member 23 and flange 22 precisely fitting the lower end of sleeve 23, the straight shoulders 22a keying said parts together to rotate said sleeve by stem 19. A gasket, such as a hard rubber seat washer 24 is carried by the bottom of the valve V of similar shape to the lower end 22 of stem 19 and is yieldingly forced against the seat at the inner end of chamber 12 by means of a coiled spring 25, said coiled spring being interposed between the washer 21 and a boss on the upper flange 19a.

A stop ring 26 extends diametrically across the outer end of casing 12 above the flange 19a and is keyed to said chamber, said stop ring having an inwardly projecting tongue 26a adapted to be engaged by a radially projecting lug 19b fixed to the valve stem 19, said parts co-operating to limit the movement of the valve in either clock-wise or counter clock-wise directions (see Fig. 4). As shown, stem 19 may be turned through greater than three-fourths of a revolution.

Two sets of laterally disposed intake ports are provided in the peripheral wall of sleeve valve member 23, each set comprising a pair of substantially diamond shaped ports extending longitudinally of sleeve 23, the corresponding ports of said sets being circumferentially arranged in the cylinder portion of sleeve 23. One set of said intake ports comprises, as illustrated, a port 27 adapted to be brought into registration with the cold water port 17 and intake port 28 adapted to be brought into registration with the hot water intake port 18. As shown in Fig. 5, ports 27 and 28 are disposed at different heights and are circumferentially alined with ports 29 and 30 of said other series through valve sleeve 23. Port 29 of said other series is, of course, adapted to communicate with cold water intake port 17 while port 30 is adapted to communicate with hot water intake 18. If desired, ports 27 and 30 may be made of slightly larger dimension than ports 28 and 29 to permit a greater amount of water to be drawn for use in the tub than in the shower bath.

An indicating dial 31 is supported from the upper end of a bonnet 32, said bonnet having threaded engagement with the bossed portion 12b of plug member 12a and surrounding the valve stem 19. Dial 31 is provided with characters or graduations to indicate various mixtures of the hot and cold water and also the shut off position of the valve and the positions for delivery to the shower and the tub. An operating handle 33 having an indicating end 33a is rigidly connected with valve stem 19 and is disposed on the outer side of dial 31, as shown in Fig. 1. Handle 33 must be connected with stem 19 in proper radial relation thereto in order that the indications on dial 31 may be followed to properly position the valve as desired.

In the hot and cold water intake fittings C and H, respectively, I provide special check valve mechanism to prevent water from flowing into chamber 12 when the mixing valve is removed from the casing VC for repair or adjustment. To this end, small cylindrical cages 34 are telescoped within each of the fittings C and H, the inner ends of said cages constituting the disc members 17a and 18a previously described in which ports 17 and 18 are provided. Each of the cages 34 has a generally cylindrical passage therethrough provided with circumferentially arranged ribs 34a, said ribs extending longitudinally of the passage and serving to guide a ball check valve 35. The inner end of each ball check valve carries a pin 35a, said pin working through a bearing in the inner end of the cage and normally projecting a slight distance beyond said end. The outer surface of the valve sleeve 23 is provided with a pair of medially disposed recesses 23a forming flat camming surfaces adapted to push the stems 35a of valves 35 inwardly during certain positions of the valve sleeve 23 relatively to chamber 12. To enable valve sleeve 23 and the valve stem 19 to be removed outwardly from the casing VC straight grooves 23b communicating with recesses 23a and extending longitudinally of sleeve 23 are formed in the outer wall thereof extending from recesses 23a to the inner end of sleeve 23. It will thus be obvious that when the pins 35a are alined with grooves 23b which is effected when the water is shut off with handle 33 disposed in the position shown in Fig. 1, that the combined valve and mixing chamber V may be lifted from the casing VC.

*Operation*

The operation of my device may be briefly described as follows:—

Assuming the combined valve and mixing chamber V and handle 33 in the position illustrated in the drawings, the valve is in closed position and liquid will not enter the mixing chamber and will not pass through the outlet ports 13 and 14, since the intake ports 27 and 28 and 29 and 30 are closed by the imperforate portions of chamber 12, and since moreover the port 22b through the lower end of stem 19 is not in registration with either of outlet ports 13 and 14. If stem 19 is turned in clockwise position communication is first made between the outlet port 22b from the mixing chamber and the outlet port 14 to the tub. Cold water intake port 27 of the valve sleeve is first brought into partial registration with the fixed cold water port 17, check valves 35 being cammed into open position during the movement of the valve stem 19. Further rotation of stem 19 in clockwise direction lessens the communication between cold water ports 17 and 27 and gradually brings the hot water intake port 30 in sleeve 23 into registration with the fixed hot water port 18 through the fitting H. Thus, at one position hot and cold water enters the mixing chamber afforded by the valve V and further rotation gradually closes off communication between the cold water port 27 and port 17 until full registration between ports 18 and 30 is effected.

Again assuming the valve V positioned in the manner shown in the drawings, namely in closed position and assuming the stem 19 turned counter-clockwise, registration is first made between the outlet port 22b at the inner or lower end of the valve V and the outlet port 13 to the shower. Cold water port 29 of the sleeve 23 is then brought into partial registration with cold water port 17 of the fitting C. Further rotating of stem 19 in counter-clockwise direction effects a full registration of ports 29 and 17, causing only cold water to pass into the mixing chamber and out through the fitting S to the shower. Further rotation of stem 19 in counter-clockwise direction causes hot water intake port 28 of sleeve 23 to begin registration with the hot water port 18 in the fitting H, the extent of communication between ports 18 and 28 increasing until half the water is drawn from the cold water supply and half from the hot water supply, water being mixed within the valve V and discharged through passage 13 and fitting S to the shower. Further rotation of stem 19 in counter-clockwise direction shuts off communication between ports 29 and 17 and fully opens communication between hot water ports 28 and 18. The recessed portions 23b on the periphery of sleeve 23 are aligned with the stems 35a of the check valves when the operating handle 33 is in the "off" or closed position. In substantially all other positions of the handle the valves 35 are forced inwardly into open position by a camming action of the periphery of the sleeve 23 with the extremities of valve stems 35a.

If it is desired to remove the combined valve and mixing chamber member which, of course, comprises the stem 19 and sleeve 23, it is only necessary to loosen plug 12a from its connection with the outer end of casing VC, stem 19 being first turned to off position and then withdraw stem 19 longitudinally from chamber 12. A new thrust washer 24 may then be applied or the valve member may be otherwise repaired or a new one substituted and check valves 35 will prevent passage of hot or cold water into the chamber 12. With my structure, therefore, it is not necessary to turn off the supplies of hot and cold water before removing the valve mechanism from the valve casing.

It will be seen that the extreme movements of handle 33 are limited by the engagement of stop lug 21b with the projecting tongue 26a of the stop ring 26. The inner end of the valve stem is resiliently held against its seat by means of the coiled spring 25, thrust washer 24 being interposed and leakage of water is thus prevented.

It is, of course, apparent that cylindrical valve V serves three distinct functions in combination with the valve casing and intake ports. It controls the admission of hot and cold water into its interior and the proportionate amounts of hot and cold water admitted. It serves as the mixing chamber when the water or fluid is being drawn from two different sources, and it further controls the delivery of the fluid or mixture into either of the two delivery passages. It will, of course, be apparent that if desired my valve may be utilized in the form herein illustrated to mix various proportions of two fluid ingredients and to discharge the desired mixtures to either of a pair of delivery outlets.

It will be apparent from the foregoing description that I have invented an extremely simple but highly efficient valve structure adapted to mix and deliver or divert fluids to at least two different conduits, and adapted to further shut off the delivery of fluid discharged. The parts are comparatively few in number and the device may be manufactured at comparatively low cost. With the combination of working elements, indicating devices, such as illustrated, can easily be installed in connection with the handle and a fixed member whereby adjustment for the desired mixture and delivery of fluid may be made with facility and without confusion.

It will, of course, be understood that various changes may be made in the form, details, arrangement and proportions of the parts without departing from the scope of applicant's invention.

What is claimed is:

1. Valve structure of the class described comprising a valve casing having a substantially cylindrical seat and at least two independent intake passages communicating with the circumferential portion of said seat at different points thereon, said casing also having at least two independent outlet passages communicating with said seat, a hollow substantially cylindrical valve mounted for oscillation in said seat, the interior of said valve constituting a mixing chamber, said valve having a plurality of laterally extending ports therethrough by which the passage of fluid from either of said intake passages may be controlled and the mixture varied as desired, said valve also having an outlet port in one end thereof adapted to deliver any desired mixture of said fluids to either of said outlet passages.

2. Valve structure of the class described comprising a casing having a substantially cylindrical valve seat and provided with a pair of independent intake passages having communication with the circumferential portion of said seat and adapted to be connected to independent sources of fluid supply, said casing also having two independent outlet passages communicating with the interior of said valve seat, a hollow cylindrical valve mounted for oscillation in said seat and provided with two circumferentially spaced sets of ports, each set comprising a pair of longitudinally spaced ports, one port of each set being adapted to register with one of said intake passages and the other port of each set being adapted to register with said other intake port and said valve also having a discharge port through one end thereof adapted to register with either of said outlet passages whereby the mixture of fluids from said sources of supply may be controlled by the movement of said valve in said casing and the desired mixture discharged through either of said outlets.

3. Valve structure of the class described comprising a casing having a substantially cylindrical valve seat and provided with a pair of independent intake passages having communication with the circumferential portion of said seat and adapted to be connected to independent sources of fluid supply, said casing also having two independent outlet passages communicating with the interior through the bottom of said casing, a hollow cylindrical valve mounted for oscillation in said seat having a bottom provided with a port adapted to communicate with either of said independent outlet passages, the circumferential wall of said valve having two circumferentially spaced sets of substantially aligned diamond shaped ports, one port of each set being adapted to register more or less with one of said intake passages to vary the opening and the other port of each set being adapted to register more or less with the other intake passage, the interior of said valve constituting a mixing chamber and a handle connected with said valve for oscillating the same.

4. Valve structure of the class described, comprising an integral casing having a bottom and a substantially cylindrical valve seat in the body thereof, said casing also affording a pair of opposed independent intake passages having communication with the circumferential portion of the seat and adapted to be connected to independent sources of fluid supply, said casing also affording two independent outlet passages curving under the bottom of said seat and communicating with the interior through said bottom, a hollow cylindrical valve mounted for oscillation in said seat and comprising an open ended cylindrical member and a stem non-rotatively connected with said cylindrical member and having spaced disks constituting top and bottom closures respectively for said cylindrical member, a discharge port through said bottom disk adapted to register with either of said outlet passages, said cylindrical member of the valve having two pairs of longitudinally spaced ports, one port of each pair being adapted to register with one of said intake passages and the other port of each pair being adapted to register with said other intake passage, the ports of said cylindrical member all being of diamond shape and means for oscillating said stem.

In testimony whereof I affix my signature.

FRED H. KRUPP.